US012572313B2

(12) United States Patent
Pang et al.

(10) Patent No.: US 12,572,313 B2
(45) Date of Patent: Mar. 10, 2026

(54) SYSTEMS AND METHODS OF CONTROLLING MAXIMIZING OF GRAPHIC DISPLAYS WITHIN A MULTI-DISPLAY HMI ENVIRONMENT FOR INDUSTRIAL SYSTEMS

(71) Applicant: ROCKWELL AUTOMATION TECHNOLOGIES, INC., Mayfield Heights, OH (US)

(72) Inventors: Yanqing Pang, Dalian (CN); Shaolong Teng, Dalian (CN); Xiaoyu Zhang, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 243 days.

(21) Appl. No.: 18/462,043

(22) Filed: Sep. 6, 2023

(65) Prior Publication Data

US 2025/0077155 A1    Mar. 6, 2025

(51) Int. Cl.
*G06F 3/14*          (2006.01)

(52) U.S. Cl.
CPC .......... *G06F 3/1423* (2013.01); *G06F 3/1446* (2013.01)

(58) Field of Classification Search
CPC .... G06F 3/1423; G06F 3/1446; G06F 3/0481; G06F 3/0482; G06F 3/048; G06F 2203/04803; G09G 5/14
See application file for complete search history.

(56) References Cited

U.S. PATENT DOCUMENTS

| | | | | |
|---|---|---|---|---|
| 11,442,439 B2 * | 9/2022 | Stump | ................ | G05B 19/4183 |
| 11,841,700 B2 * | 12/2023 | Stump | ................ | G05B 19/4183 |
| 11,886,766 B2 * | 1/2024 | Fitzgerald | ............. | G06F 3/0482 |
| 12,314,625 B2 * | 5/2025 | Pang | .................... | G06F 3/1446 |
| 2022/0164156 A1 * | 5/2022 | Fitzgerald | ............ | H04N 23/698 |

* cited by examiner

*Primary Examiner* — Vijay Shankar

(74) *Attorney, Agent, or Firm* — Quarles & Brady LLP

(57)          ABSTRACT

Systems and methods of controlling graphic displays within a multi-display human machine interface ("HMI") environment for industrial systems. One system includes an electronic processor configured to execute the HMI-client application for the industrial system. The electronic processor may be configured to determine a set of display parameters for the HMI-client application. The electronic processor may be configured to determine, based on the set of display parameters, a configuration for a first display frame included in a plurality of display frames for the HMI-client application. The electronic processor may be configured to generate, based on the configuration, a first graphic display within the first display frame. The electronic processor may be configured to display, via a first display device of the plurality of display devices, the first graphic display within the first display frame such that the first graphic display is maintained within the first graphic display.

17 Claims, 12 Drawing Sheets

700

900

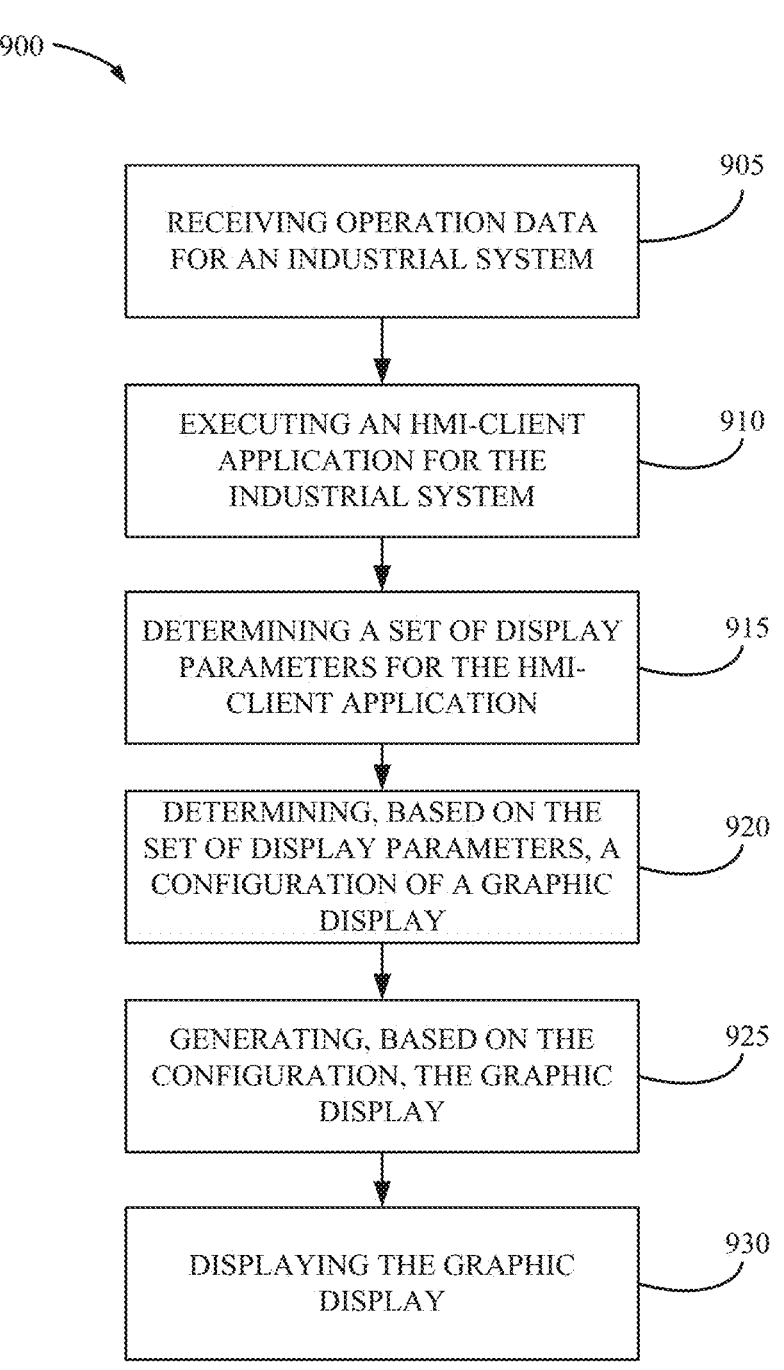

905 RECEIVING OPERATION DATA
FOR AN INDUSTRIAL SYSTEM

910 EXECUTING AN HMI-CLIENT
APPLICATION FOR THE
INDUSTRIAL SYSTEM

915 DETERMINING A SET OF DISPLAY
PARAMETERS FOR THE HMI-
CLIENT APPLICATION

920 DETERMINING, BASED ON THE
SET OF DISPLAY PARAMETERS, A
CONFIGURATION OF A GRAPHIC
DISPLAY

925 GENERATING, BASED ON THE
CONFIGURATION, THE GRAPHIC
DISPLAY

930 DISPLAYING THE GRAPHIC
DISPLAY

SYSTEMS AND METHODS OF CONTROLLING MAXIMIZING OF GRAPHIC DISPLAYS WITHIN A MULTI-DISPLAY HMI ENVIRONMENT FOR INDUSTRIAL SYSTEMS

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to controlling graphic displays within a multi-display human machine interface ("HMI") environment for industrial systems.

Human-machine interface ("HMI") software generally enables interaction between an industrial system and a user, such as, e.g., for process monitoring and supervisory control for the industrial system. In some instances, HMI software may be provided to and interacted with by a user from a control room having, e.g., a user device and one or more display devices (e.g., as a multi-display HMI environment). In some examples, the multi-display HMI environment may include multiple display devices connected (or otherwise linked) to a single workstation, such that the multiple display devices may emulate a single large or oversized display device (e.g., an HMI-client frame). Alternatively, or in addition, in some examples, the multi-display HMI environment may include a single display device, where a display area of the single display device is divided or segmented into smaller display areas. For example, for a display device having an ultra-high-definition ("UHD") resolution (e.g., 4K, 3840×2160), the display device may be divided into smaller display areas (e.g., four display areas with 1920×1080 resolution in pixels).

For example, HMI software may provide a graphical user interface ("GUI") of a dashboard with operation information and input/output controls for operating, controlling, and monitoring an industrial system (or equipment included therein). In some instances, the HMI software may provide information associated with the industrial system via one or more graphic displays. A graphic display may also be referred to herein as a graphic display screen, window, or user interface. A graphic display may represent, e.g., a runtime operator's view of a plant or facility activity, including activity of one or more industrial systems included therein. When interacting with a multi-display HMI environment, the HMI software may enable the display of one or more graphic displays, where each graphic display may be provided or displayed within a display frame (or a display area or portion thereof) of a corresponding display device (e.g., a portion of a display area of a single display device, a display area of one display device of the display devices included in the multi-monitor environment, etc.).

Accordingly, in some instances, a user may launch the HMI software such that the HMI software is displayed within an HMI-client frame. The HMI software may be displayed via one or more user interfaces (e.g., a graphical user interface ("GUI")), windows, screens, etc. In some instances, the HMI software may be displayed via one or more graphic display windows. The HMI-client frame may include a display area of the multi-display HMI environment (e.g., a total display area provided by the one or more display devices). For example, when the multi-display HMI environment includes two display devices, the HMI-client frame may include the display area of the first display device and the display area of the second display device. The HMI-client frame may be divided or segmented into a plurality of graphic display frames. A graphic display frame may define a border or boundary of a display region included within the HMI-client frame. For example, the graphic display frame may include a display area of a display device included in the multi-display HMI environment. As another example, the graphic display frame may include a portion of the display area of a display device included in the multi-display HMI environment.

For instance, in some configurations, a user may launch a single instance of the HMI software, where the single instance of the HMI software is displayed (via, e.g., one or more GUIs, windows, screens, etc.) within an HMI-client frame and each graphic display window for that single instance is displayed within a corresponding graphic display frame of the HMI-client frame. Accordingly, a user may open and view multiple graphic display windows simultaneously across multiple display areas or devices, where each graphic display may be launched (or displayed) within a specific graphic display frame.

As part of interacting with (or viewing) the graphic displays, a user may choose to maximize (or otherwise resize) the graphic display window such that an area of the graphic display window is substantially the same as the display area included in the display frame (e.g., increase a size of the graphic display window to fill a display frame). However, when using some HMI software within a multi-display HMI environment, maximizing the display graphic window may result in the display graphic window being maximized across multiple display areas (e.g., across multiple graphic display frames). For example, the HMI software may maximize the graphic display window with respect to the HMI-client frame, such that the maximized graphic display window fills the HMI-client frame.

For instance, some HMI software may enable multiple display devices to be configured as an individual HMI software client such that, when the individual HMI software client is running, a user may open and interact with one or more graphic display windows simultaneously across the multiple display devices such that the one or more graphic display windows interact with each other. Accordingly, deploying a single HMI software client application (e.g., a single HMI-client frame or single HMI-client instance) on multiple display devices enables interaction between the graphic display windows. However, deploying the HMI software as a single HMI-client instance or frame results in maximization of the graphic display windows across multiple display devices (e.g., across the single HMI-client instance or frame). This generally results in users manually configuring each graphic display window (e.g., size or position) and other settings as target display resolutions. In particular, some HMI software does not enable a user to design project templates for later deployment to any monitor resolution (e.g., various multi-display HMI environment layouts or arrangements).

Further, some HMI software may not facilitate automated arrangement and sizing of multi-display HMI environments. For example, when some HMI software is implemented within a multi-display HMI environment, a user configures setting(s) for the multi-display HMI environment, such as, e.g., a display device size (e.g., in pixels), a display device arrangement or layout, etc. For example, the user may manually specify a size for each display device based on a particular layout. Accordingly, when an arrangement of the multi-display HMI environment changes (e.g., a display device layout changes from a two-by-two display device layout to a one-by-three display device layout), the settings for the multi-display HMI environment may be manually updated by the user.

Accordingly, some approaches to maximizing a graphic display window in a multi-display HMI environment may result in technical challenges and adverse impacts to the effectiveness of HMI software. For instance, such approaches to maximizing graphic display windows may adversely impact HMI software performance and user experience by introducing inefficiencies, underutilization of displayable area, confusion, etc. For example, when a graphic display window is maximized across multiple display devices, a user's view of other graphic display windows may be obstructed by the maximized graphic display window. This generally results in a user manually adjusting the size of the graphic display window to fill a corresponding display frame, which introduces inefficiencies and underutilization of displayable area. Additionally, when a graphic display window does not fill a display area of the graphic frame, the un-filled portions of the display area (e.g., areas that are not displaying the graphic display window) may be wasted display space, which, ultimately, results in underutilization of the displayable area provided by the multi-display HMI environment.

To solve these and other technical problems associated with some approaches to maximizing graphic display windows in a multi-display HMI environment, the technology disclosed herein provide technical solutions that advantageously improve performance, efficiency, and user experience. The technology disclosed herein may include methods and systems that provide a software framework to support maximization functionality for graphic display windows such that user experience is enhanced, and user efficiency is increased. For instance, the technology disclosed herein may enable maximization of a graphic display window where the graphic display window is maximized relative to a display frame of that graphic display window as opposed to an entire HMI-client frame. Accordingly, the technology disclosed herein enables HMI software, which may have been originally designed for implementation with a single display device, to be deployed to multi-display HMI environment without having to modify application settings (e.g., such as graphic display window position, graphic display size, etc.) by having the graphic display window position being relative to a particular display device (e.g., a display frame of that particular display device).

The technology disclosed herein provides systems and methods of controlling graphic displays within a multi-display human machine interface ("HMI") environment for industrial systems. One configuration provides a system of controlling graphic displays within a multi-display HMI environment for industrial systems. The system may include a plurality of display devices configured to provide, within the multi-display HMI environment, an HMI-client application configured to provide a plurality of graphic display user interfaces for an industrial system. The system may include one or more electronic processors communicatively coupled to the plurality of display devices. The one or more electronic processors may be configured to execute, within the multi-display HMI environment, the HMI-client application for the industrial system. The one or more electronic processors may be configured to determine a set of display parameters for the HMI-client application, the set of display parameters including resolution data for the plurality of display devices and a layout of the plurality of display devices. The one or more electronic processors may be configured to determine, based on the set of display parameters, a configuration for a first display frame included in a plurality of display frames for the HMI-client application. The one or more electronic processors may be configured to generate, based on the configuration, a first graphic display user interface within the first display frame. The one or more electronic processors may be configured to display, via a first display device of the plurality of display devices, the first graphic display user interface within the first display frame such that the first graphic display user interface is maintained within the first graphic display.

Another configuration provides a method of controlling graphic displays within a multi-display human machine interface ("HMI") environment for industrial systems. The method may include executing, with one or more electronic processors, an HMI-client application for an industrial system within the multi-display HMI environment including a plurality of display devices. The method may include determining, with the one or more electronic processors, a set of display parameters for the HMI-client application, the set of display parameters including resolution data for the plurality of display devices and a layout of the plurality of display devices. The method may include determining, with the one or more electronic processors, a resolution of a first display device of the plurality of display devices based on the resolution data. The method may include determining, with the one or more electronic processors, a position of the first display device within the HMI-client frame based on the layout of the plurality of display devices. The method may include determining, with the one or more electronic processors, a configuration for the first display frame included in the plurality of display frames for the HMI-client application, wherein the configuration for the first display frame is based on the resolution and the position of the first display device. The method may include generating, based on the configuration, a first graphic display user interface within the first display frame. The method may include transmitting, with the one or more electronic processors, to the first display device, the first graphic display user interface for display via the first display device such that, when maximized, the first graphic display user interface is maintained within the first graphic display.

Yet another configuration provides a non-transitory, computer-readable medium storing instructions that, when executed by an electronic processor, perform a set of functions. The set of functions may include executing, within a multi-display HMI environment including a plurality of display devices, an HMI-client application for an industrial system, the HMI-client application including a plurality of graphic display user interfaces, wherein an HMI-client frame for displaying the HMI-client application includes a display area of the plurality of display devices and wherein the HMI-client frame includes at least one corresponding display frame for each graphic display user interface of the plurality of graphic display user interfaces. The set of functions may include determining a set of display parameters for the HMI-client application, the set of display parameters including resolution data for the plurality of display devices and a layout of the plurality of display devices. The set of functions may include determining, based on the set of display parameters, a configuration for a first display frame included in a plurality of display frames for the HMI-client application. The set of functions may include generating, based on the configuration, a first graphic display user interface within the first display frame. The set of functions may include displaying, via a first display device of the plurality of display devices, the first graphic display user interface within the first display frame. The set of functions may include receiving a maximization command for the first graphic display user interface. The set of functions may include, responsive to receipt of the maximization command, maximizing the first graphic display user interface such that the first graphic display user interface is maintained within the first display frame when maximized.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects, and advantages other than those set forth above will become apparent when consideration is given to the following detailed description thereof. Such detailed description makes reference to the following drawings.

FIG. 9 is a flowchart illustrating a method for controlling graphic displays within a multi-display human machine interface ("HMI") environment for industrial systems according to some configurations.

DETAILED DESCRIPTION

Figure 1:
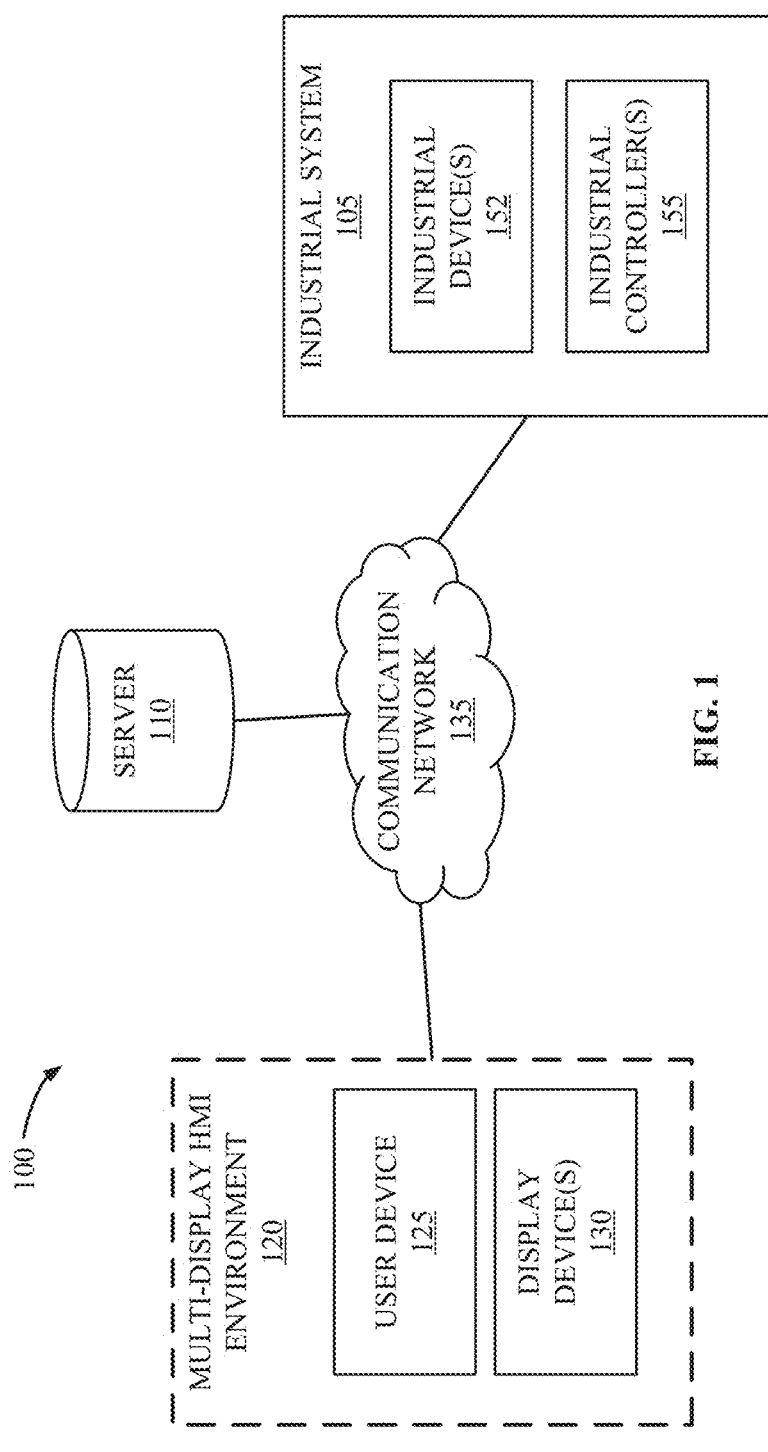
FIG. 1 schematically illustrates a system for controlling graphic displays within a multi-display human machine interface ("HMI") environment for industrial systems according to some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for controlling graphic displays within a multi-display human machine interface ("HMI") environment for industrial systems according to some configurations. In the illustrated example, the system 100 may include an industrial system 105, a server 110, and a multi-display HMI environment 120, which may include a user device 125 and a set of display devices 130 (collectively referred to herein as "the display devices 130" and individually as "the display device 130"). In some embodiments, the system 100 includes fewer, additional, or different components in different configurations than illustrated in FIG. 1. As one example, the system 100 may include multiple industrial systems 105, multiple servers 110, multiple multi-display HMI environments 120, multiple user devices 125, or a combination thereof. As another example, one or more components of the system 100 may be combined into a single device, such as, e.g., the user device 125 and the server 110 or one or more of the display devices 130 and the user device 125. Alternatively, or in addition, in some configurations, the user device 125, the server 110, the display device(s) 130, or a combination thereof may be included as part of the industrial system 105 (e.g., as a component of the industrial system 105).

The industrial system 105, the multi-display HMI environment 120 (including the user device 125 and the display device(s) 130), and the server 110 may communicate over one or more wired or wireless communication networks 135. Portions of the communication networks 135 may be implemented using a wide area network, such as the Internet, a local area network, such as BLUETOOTH® or WI-FI®, and combinations or derivatives thereof. Alternatively, or in addition, in some configurations, components of the system 100 may communicate directly as compared to through the communication network 135. Also, in some configurations, the components of the system 100 may communicate through one or more intermediary devices not illustrated in FIG. 1.

The industrial system 105 may be a manufacturing system, such as, e.g., an industrial automation system or the like. The industrial system 105 may be associated with (or located at) a facility or site. In some configurations, a facility or site may be associated with multiple industrial systems 105 (e.g., a first industrial system, a second industrial system, a third industrial system, etc.). Alternatively, or in addition, in some configurations, the system 100 may include a first industrial system located at a first facility and a second industrial system located as a second facility different from the first facility.

The industrial system 105 may be configured to perform one or more industrial processes, manufacturing processes, production processes, or the like. In some configurations, the industrial system 105 may perform a production method that produces goods or products. As one example, the industrial system 105 may perform a vehicle manufacturing processor to assemble or produce a vehicle (or various components thereof). As another example, the industrial system 105 may perform a food manufacturing process for making a food product. As yet another example, the industrial system 105 may perform a pharmaceutical manufacturing process for producing pharmaceuticals.

In the illustrated example, the industrial system 105 may include one or more industrial devices 152 (referred to herein collectively as "the industrial devices 152" and individually as "the industrial device 152") and one or more industrial controllers 155 (referred to herein collectively as "the industrial controllers 155" and individually as "the industrial controller 155"). The industrial device 152, the industrial controller 155, or a combination thereof may be a physical piece of equipment included in the industrial system 105. For example, an industrial device 152 may include a pump, a press, a conveyor, a valve, a switch, a sensor, a server, a database, a human-machine interface ("HMI"), another piece of equipment that may be used in connection with an associated industrial process or application of the industrial system 105, or the like. The industrial controller 155 may be a programmable logic controller ("PLC") or the like. In some configurations, the industrial controller 155 may be communicatively coupled to at least one industrial device 152 included in the industrial system 105 such that the industrial controller 155 may control an operation or functionality associated with the at least one industrial device 152 included in the industrial system 105.

Figure 2:
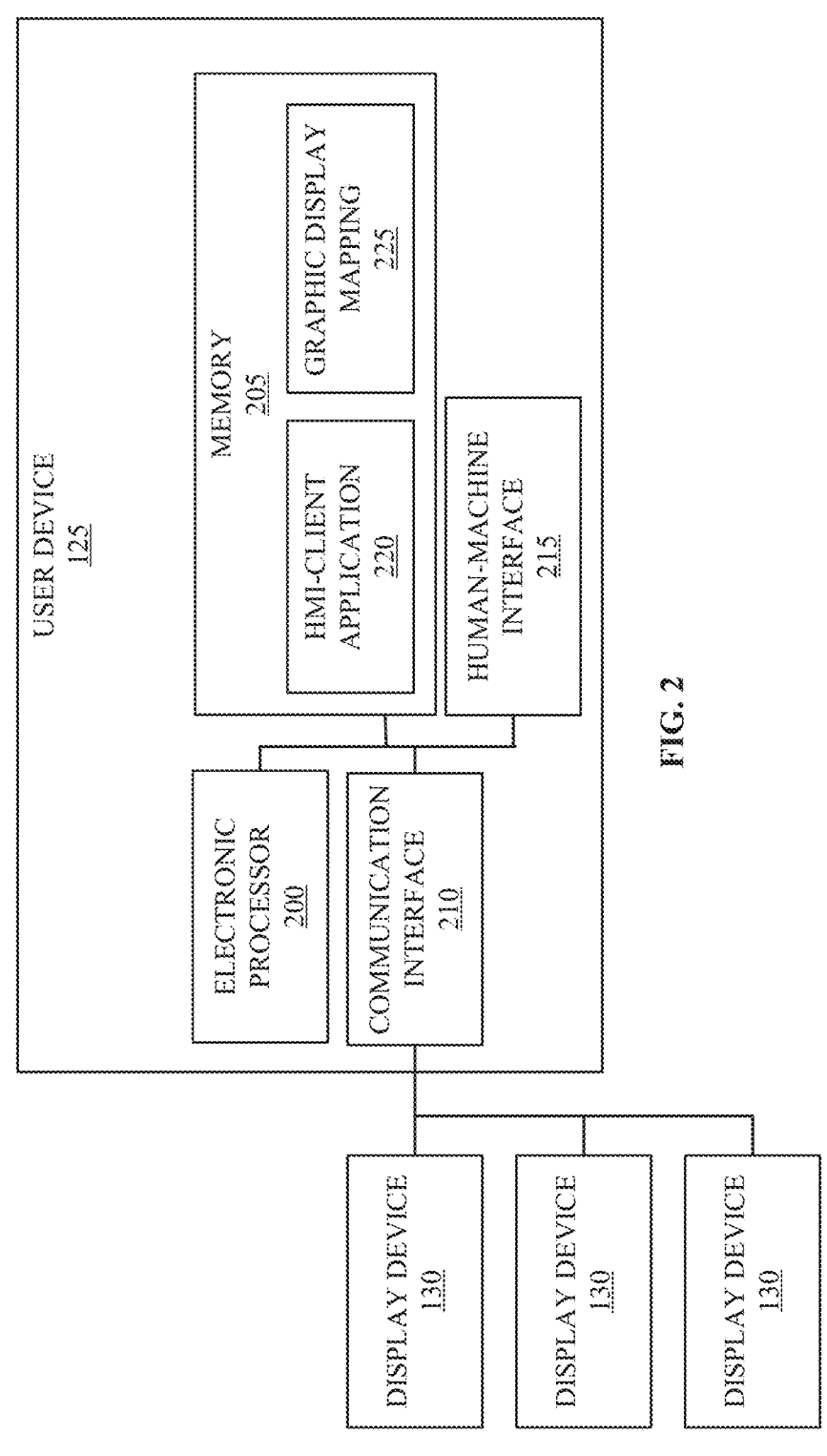
FIG. 2 schematically illustrates a user device included in the system of FIG. 1 according to some configurations.

The user device 125 may be a computing device, such as a desktop computer, a laptop computer, a tablet computer, a terminal, a smart telephone, a smart television, a smart wearable, or another suitable computing device that interfaces with a user. As illustrated in FIG. 2, the user device 125 may include an electronic processor 200, a memory 205, and a communication interface 210, and a human-machine interface ("HMI") 215. The electronic processor 200, the memory 205, the communication interface 210, and the HMI 215 may communicate wirelessly, over one or more communication lines or buses, or a combination thereof. The user device 125 may include additional components than those illustrated in FIG. 2 in various configurations. The user device 125 may also perform additional functionality other than the functionality described herein. Also, the functionality (or a portion thereof) described herein as being performed by the user device 125 may be distributed among multiple devices (e.g., as part of a cloud service or cloud-computing environment), combined with another component of the system 100 (e.g., combined with the server 110, another component of the system 100, another remote device, or the like), or a combination thereof.

The communication interface 210 may include a transceiver that communicates with the industrial system 105, the server 110, the display device(s) 130, another component of the multi-display HMI environment 120, or a combination thereof over the communication network 135 and, optionally, one or more other communication networks or connections. In some configurations, the communication interface 210 enables the user device 125 to communicate with the industrial system 105, the server 110, the display device(s)

130, another component of the multi-display HMI environment 120, or a combination thereof over one or more wired or wireless connections. The electronic processor 200 may include a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

As one example, as illustrated in FIG. 2, the memory 205 may include an HMI-client application 220 (referred to herein as "the application 220") and a graphic display mapping 225. Although FIG. 2 illustrates the application 220, the graphic display mapping 225, or a combination thereof as being stored in the memory 205, in some configurations, the application 220, the graphic display mapping 225, or a combination thereof may be stored external to the memory 205, such as in one or more remote devices (e.g., the server 110).

The application 220 may be a software application executable by the electronic processor 200 in the example illustrated and as specifically discussed below, although a similarly purposed module may be implemented in other ways in other examples. In some configurations, the application 220 is an HMI software that enables interaction between the industrial system 105 (or components thereof) and a user. Accordingly, in some configurations, the electronic processor 200 may execute the application 220 to provide process monitoring and supervisory control for the industrial system 105 (or component(s) thereof). For instance, the electronic processor 200 may execute the application 220 to provide a graphical user interface ("GUI") of a dashboard with input/output controls for operating, controlling, and monitoring the industrial system 105. The electronic processor 200 may execute the application 220 to provide information related to operation of the industrial system 105, such as, e.g., security and alarms related information, production related information, trend related information, efficiency related information, diagnostic related information, process related information, etc. In some configurations, the electronic processor 200 may execute the application 220 to provide, e.g., diagnostic messages, health monitoring services, and access to real-time (or near real-time) data (e.g., operation data for the industrial system 105).

In some instances, the electronic processor 200 may execute the application 220 to provide information associated with the industrial system 105 via one or more graphic display windows (also referred to herein as graphic displays, graphic display screens, or graphic display user interfaces). For example, as noted herein, HMI software (e.g., the application 220) may provide a GUI that includes a dashboard with operation information and input/output controls for operating, controlling, and monitoring industrial systems (or equipment included therein). In some instances, the application 220 may provide the dashboard via one or more graphic displays (also referred to herein as graphic display windows or graphic display screens). A graphic display window may be a user interface, such as, e.g., a GUI. The graphic display window may provide information associated with the industrial system 105, such as, e.g., productivity related information, performance related information, maintenance related information, production related information, etc. A graphic display window may include one or more graphical objects representing data for the industrial system 105. Alternatively, or in addition, a graphic display window may include text objects representing data for the industrial system 105 (e.g., raw data, processed data, etc.).

Information associated with the industrial system 105 may include information describing an operation performed by the industrial system 105, such as, e.g., a process, a recipe, etc. Alternatively, or in addition, information associated with the industrial system 105 may include information related to the production of a particular product or part (e.g., total parts, good parts, scrap parts, part type, etc.). Alternatively, or in addition, information associated with the industrial system 105 may include information associated with one or more components of the industrial system 105, such as, e.g., one or more industrial devices 152, industrial controllers 155, etc. For example, the information associated with the industrial system 105 may include productivity related information, performance related information, status related information, etc. for a particular component (or group of components) of the industrial system 105.

In some configurations, a graphic display window may be specific to a particular feature or attribute of the industrial system 105 (e.g., provide information associated with that particular feature or attribute). For example, the graphic display may be specific to a process performed by the industrial system 105, a product produced by the industrial system 105, a region or grid of the industrial system 105, etc. For example, the graphic display may be a main screen providing an overview of the industrial system 105, an alarm screen providing alarm related information associated with the industrial system 105 (e.g., an alarm status for one or more components of the industrial system 105, a location of a triggered alarm, etc.), a trend screen that provides trend data associated with the industrial system 105, a data log that provides a read out of data associated with the industrial system 105, a grid control screen that enables a user to interact with or control one or more grids of the industrial system 105, etc. Accordingly, in some configurations, a graphic display window may provide information specific to a particular feature or attribute of the industrial system 105.

Accordingly, in some examples, a graphic display window may represent (or otherwise provide) a runtime operator's view of the industrial system 105 (or component(s) or process(es) thereof). In some configurations, the graphic display window may provide industrial system or process data. Alternatively, or in addition, in some configurations, the graphic display window may enable receipt of user input, such as, e.g., enable an operator to write values to the industrial device(s) 152, the industrial controller(s) 155, etc.

Figure 3:
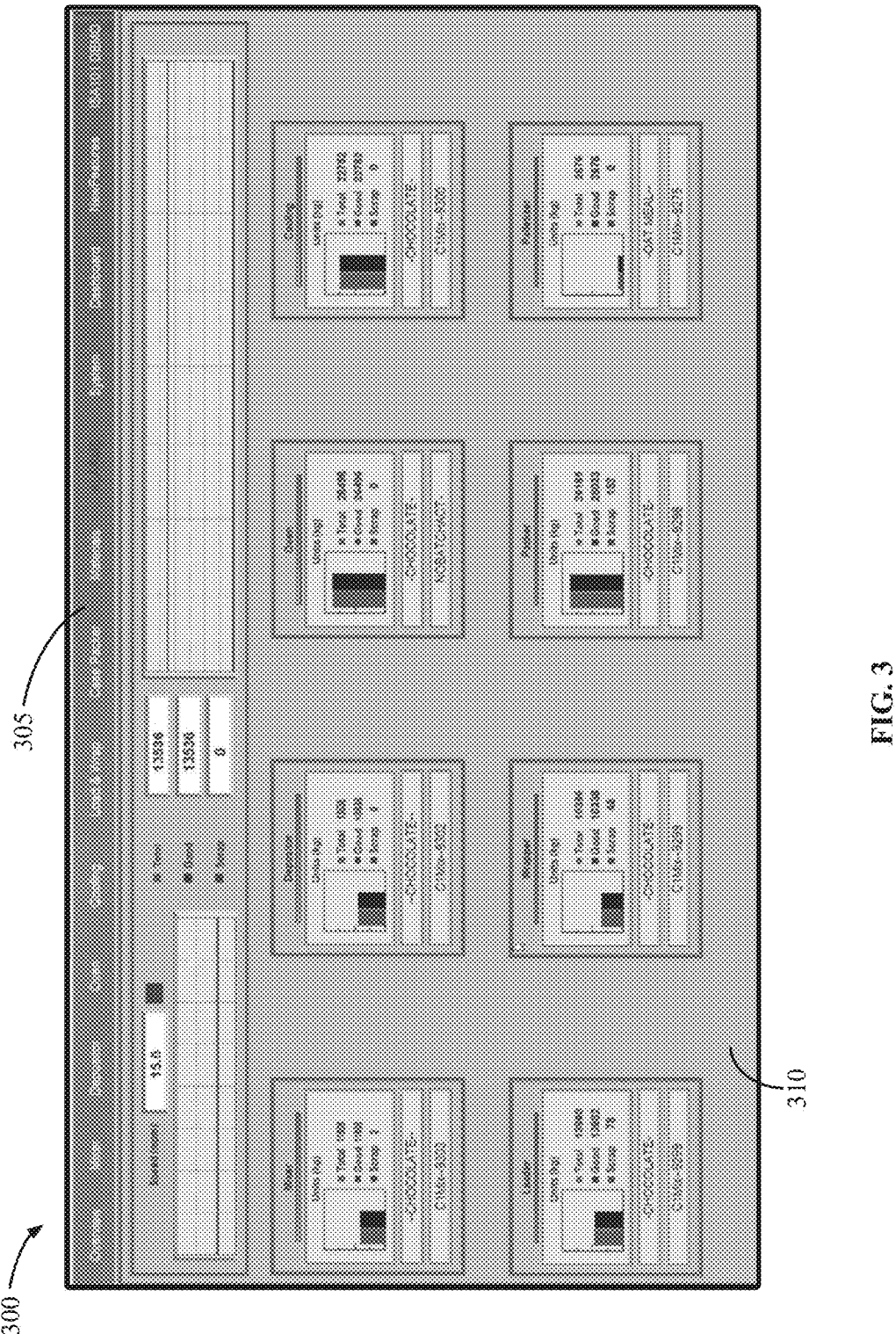
FIG. 3 illustrates an example graphic display window for an industrial system according to some configurations.

FIG. 3 illustrates an example graphic display window 300 for the industrial system 105 according to some configurations. As illustrated in FIG. 3, the graphic display window 300 includes a header portion 305 and a content portion 310. The header portion 305 may be a navigation bar, a menu bar, a command bar, etc. Accordingly, in some configurations, the header portion 305 may include one or more interactive elements or objects. A user may interact with the graphic display window 300 via the interactive elements (e.g., select with a mouse click, etc.). The content portion 310 may include an area of the graphic display window 300 in which content or data of the industrial system 105 related to the graphic display window 300 may be displayed or otherwise provided to a user. The content portion 310 may include one or more graphic objects (e.g., graphs), text objects, etc. that provide information or data related to various components of the industrial system 105 (e.g., the industrial device(s) 152, the industrial controller(s) 155, etc.). In the illustrated example of FIG. 3, the content portion 310 provides information related to the production of a product or material in terms of a total count, a good count, and a scrap count, by component of the industrial system 105 (e.g., a mixer, a depositor, an oven, a cooling component, a loader, a wrapper, a packer, and a palletizer).

Figure 4:
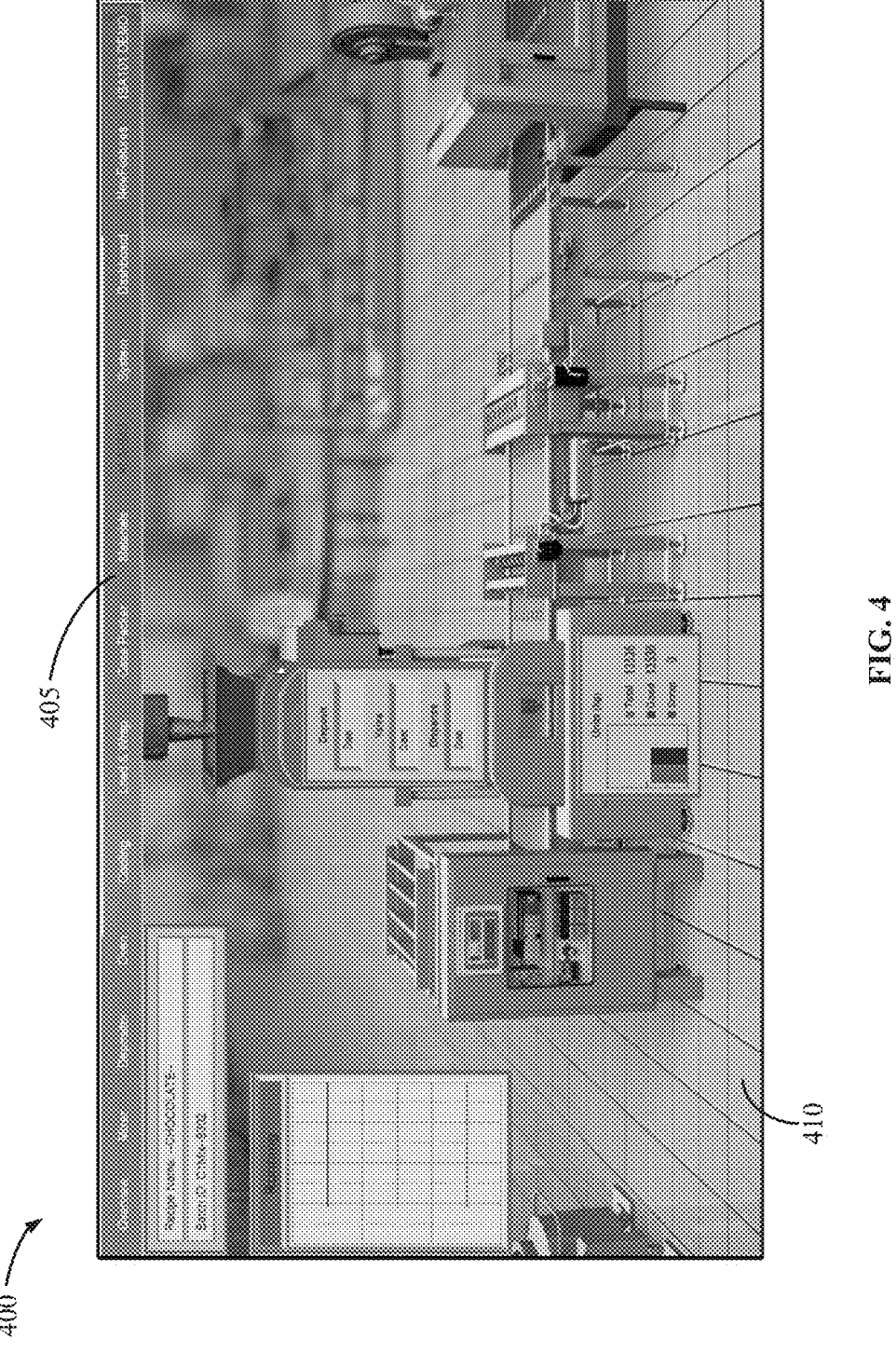
FIG. 4 illustrates another example graphic display window for an industrial system according to some configurations.
Figure 5:
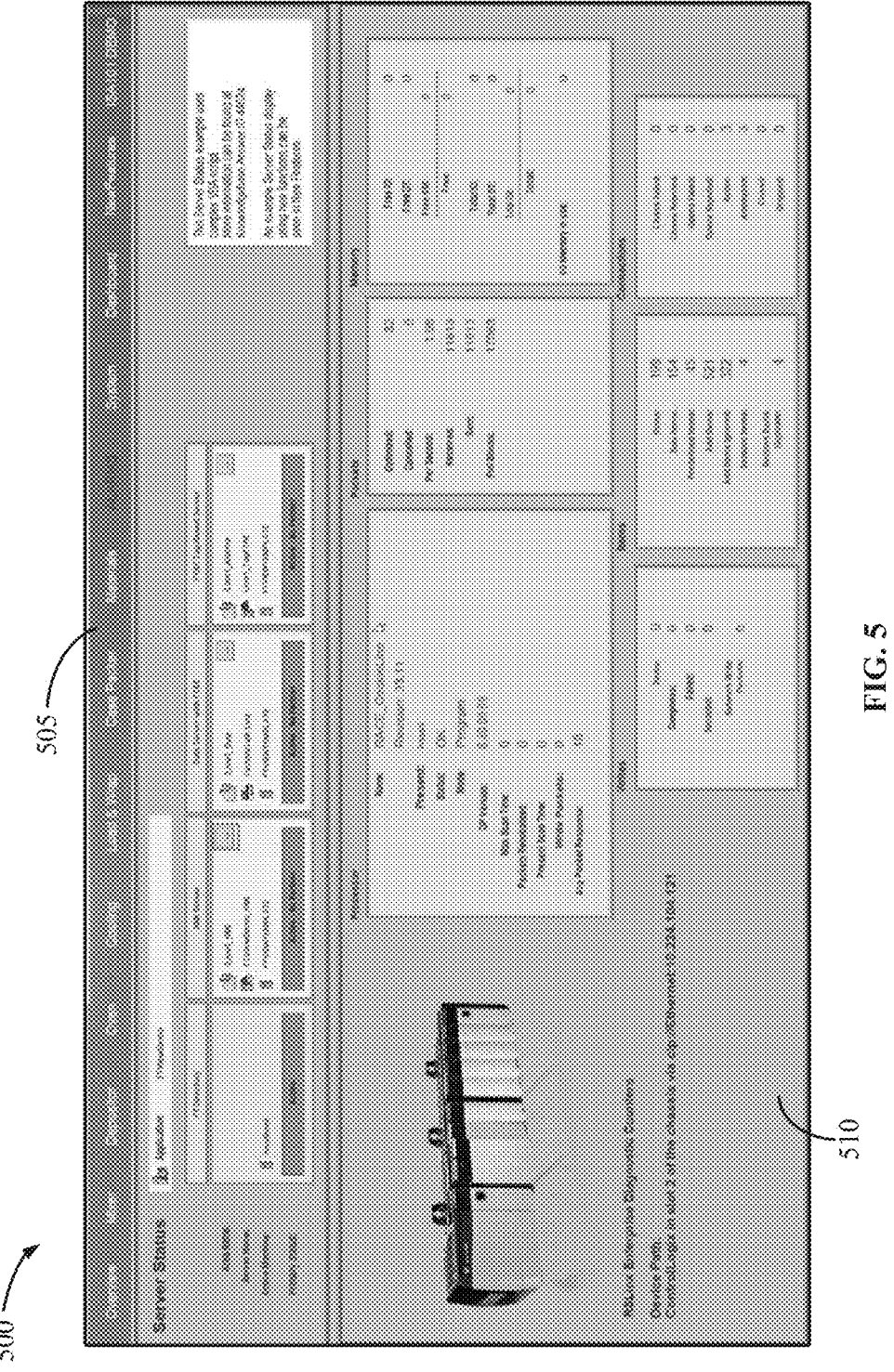
FIG. 5 illustrates another example graphic display window for an industrial system according to some configurations.

FIG. 4 illustrates another example graphic display window 400 for the industrial system 105 according to some configurations. The graphic display window 400 provides information associated with a process (e.g., a recipe). As illustrated in FIG. 4, the graphic display window 400 includes a header portion 405 (e.g., similar to the header portion 305 of FIG. 3) and a content portion 410 (e.g., similar to the content portion 310 of FIG. 3). FIG. 5 illustrates another example graphic display window 500 for the industrial system 105 according to some configurations. The graphic display window 500 provides information associated with a server status. As illustrated in FIG. 5, the graphic display window 500 includes a header portion 505 (e.g., similar to the header portion 305 of FIG. 3) and a content portion 510 (e.g., similar to the content portion 310 of FIG. 3).

As illustrated in FIG. 2, the memory 205 may also include the graphic display mapping 225. The graphic display mapping 225 may include display parameters associated with one or more graphic display windows. For instance, the graphic display mapping 225 may include display parameters for graphic display windows configured by a user (e.g., as described in greater detail herein with respect to FIG. 10). In some configurations, the graphic display mapping 225 includes a list of graphic display windows configured by a user and corresponding display parameters for each graphic display window configured by the user. For example, the graphic display mapping 225 may include a set of associations between graphic display windows and corresponding display parameters (e.g., z-order information, position, etc.). In some configurations, the graphic display mapping 225 includes, for each of the configured display frames, a position (e.g., a position (or display device 130) within the multi-display HMI environment 120), a size (e.g., a resolution or pixel size), etc. In some configurations, the electronic processor 200 may access the graphic display mapping 225 as part of executing the application 220 to, ultimately, generate and provide the graphic display window(s) to an operator or user, as described in greater detail herein.

Returning to FIG. 2, the user device 125 may include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the user device 125. For example, the HMI 215 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof.

As illustrated in FIG. 2, in some configurations, the user device 125 may be communicatively coupled to the display device(s) 130. For instance, when the user device 125 is included within a multi-display HMI environment (e.g., the multi-display HMI environment 120 of FIG. 1), the user device 125 may be in communication with one or more external display devices (e.g., monitors). Alternatively, or in addition, in some configurations, one of the display devices 130 may be included as a display device of the HMI 215. For example, a display device 130 may be included in the same housing as the user device 125 (e.g., as a display screen of the user device 125). Alternatively, or in addition, in some instances, the display devices 130 may communicate with the user device 125 over one or more wired or wireless connections. For example, in some configurations, the display device(s) 130 is a touchscreen included in a laptop computer or a tablet computer (e.g., the user device 125). In other configurations, the display device(s) 130 is a monitor, a television, or a projector coupled to a terminal, a desktop computer, or the like via one or more cables.

Returning to FIG. 1, the system 100 may also include the server 110. The server 110 may be a computing device. Although not illustrated in FIG. 1, the server 110 may include similar components as the user device 125, such as electronic processor (for example, a microprocessor, an ASIC, or another suitable electronic device), a memory (for example, a non-transitory, computer-readable storage medium), a communication interface, such as a transceiver, for communicating over the communication network 135 and, optionally, one or more additional communication networks or connections, and one or more HMIs. For example, to communicate with the user device 125, the server 110 may store a browser application or a dedicated software application executable by an electronic processor. The server 110 may host or otherwise provide at least one industrial system service or platform (e.g., a process monitoring and supervisory control service). Accordingly, in some configurations, the server 110 is associated with an industrial system service (e.g., included as a component, device, or subsystem of a system providing or hosting an industrial system service). Alternatively, or in addition, in some configurations, the functionality described herein as being performed by the user device 125 may be locally performed by the server 110. For example, in some configurations, the server 110 may store the application 220.

Figure 6:
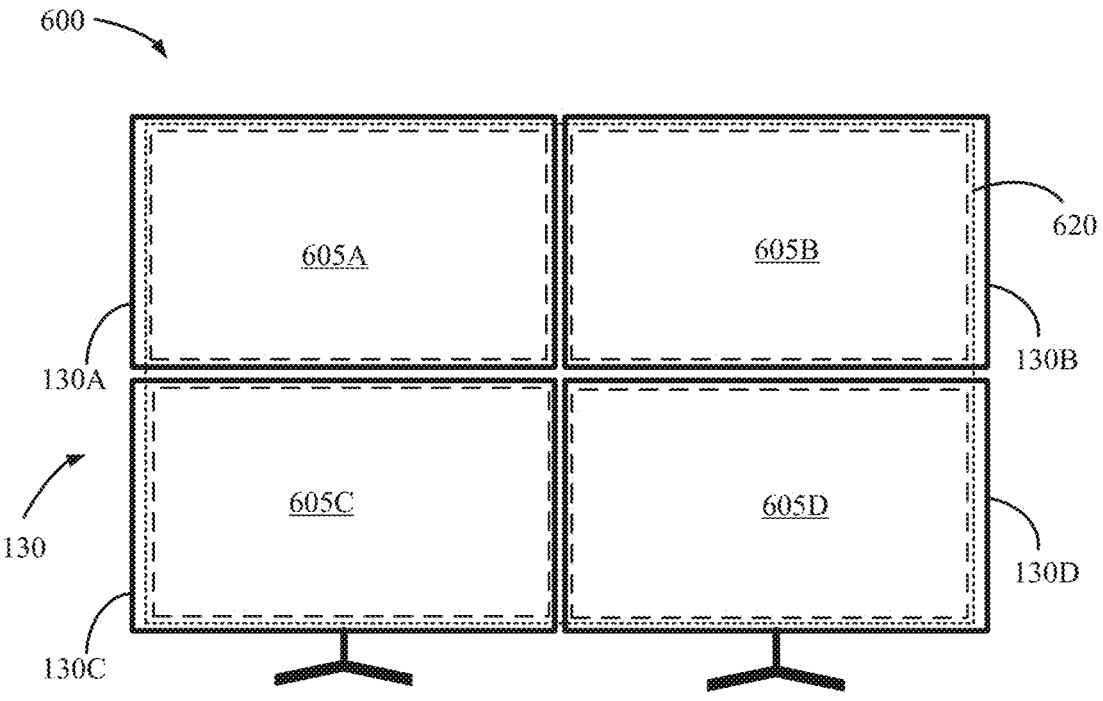
FIG. 6 illustrates an example multi-display HMI environment according to some configurations.

As noted herein, the user device 125 and the display devices 130 may be included in the multi-display HMI environment 120. FIG. 6 illustrates an example arrangement or layout of a multi-display HMI environment 600 (e.g., the multi-display HMI environment 120 of FIG. 1). As illustrated in FIG. 6, the multi-display HMI environment 600 includes four display devices 130 (represented in FIG. 6 as a first display device 130A, a second display device 130B, a third display device 130C, and a fourth display device 130D), where the display devices 130 are arranged in a two-by-two configuration. Each of the display devices 130 may include a display area (e.g., an area for displaying content to a user). The display area of the display device(s) 130 may be defined by a display frame (e.g., a border or boundary of a corresponding display area). For example, as illustrated in FIG. 6, the first display device 130A includes a first display frame 605A, the second display device 130B includes a second display frame 605B, the third display device 130C includes a third display frame 605C, and the fourth display device 130D includes a fourth display frame 605D. As also illustrated in FIG. 6, the multi-display environment 120 may provide an HMI-client frame 620 (generally represented in FIG. 6 as a dashed line). The HMI-client frame 620 represents a display area (or total display area) for the application 220 (e.g., the HMI software or client application). As illustrated in FIG. 6, the HMI-client frame 620 includes the display areas of the display devices 130. For instance, as illustrated in FIG. 6, the HMI-client frame 620 includes the first display frame 605A, the second display frame 605B, the third display frame 605C, and the fourth display frame 605D. Accordingly, in some configurations, the HMI-client frame 620 may be divided or segmented into sub-frames (e.g., the display frames 605A-D).

Figure 7:
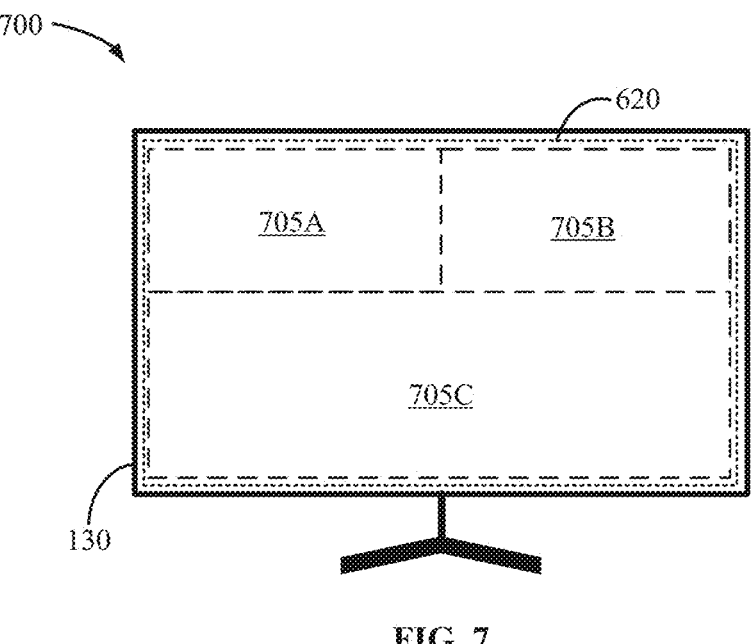
FIG. 7 illustrates another example multi-display HMI environment according to some configurations.

In some configurations, a display frame may define a portion of a display area for a display device 130. For example, FIG. 7 illustrates another example multi-display HMI environment 700 (e.g., the multi-display HMI environment 120) according to some configurations. As illustrated in FIG. 7, the multi-display HMI environment 700 includes a single display device (e.g., the display device 130) that includes the HMI-client frame 620. The display device 130 may include a plurality of display frames 705 (e.g., a first display frame 705A, a second display frame 705B, and a third display frame 705C). As illustrated in FIG. 7, in some configurations, the HMI-client frame 620 may include display frames of different sizes or shapes. Alternatively, as illustrated in FIG. 6, the HMI-client frame 620 may include display frames that are the same (or substantially similar) in size or shape.

Figure 8:
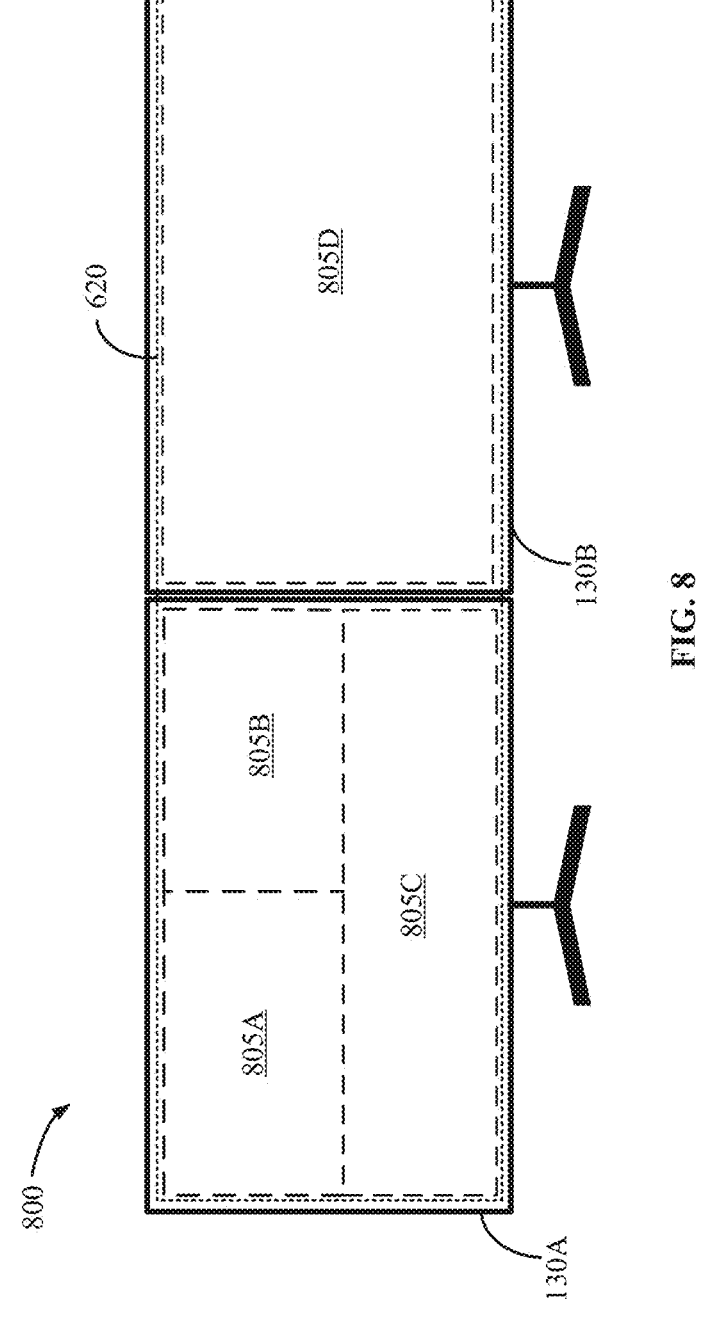
FIG. 8 illustrates another example multi-display HMI environment according to some configurations.

FIG. 8 illustrates another example multi-display HMI environment 800 (e.g., the multi-display HMI environment 700) according to some configurations. As illustrated in FIG. 8, the multi-display HMI environment 800 may include two display devices 130 (e.g., a first display device 130A and a second display device 130B). The HMI-client frame 620 extends across the first display device 130A and the second display device 130B. As illustrated in FIG. 8, the first display device 130A includes a set of display frames 805 (e.g., a first display frame 805A, a second display frame 805B, and a third display frame 805C) and the second display device 130B includes a single display frame 805 (e.g., a fourth display frame 805D). Accordingly, as illustrated by the example of FIG. 8, in some configurations, each display device 130 may be associated with or include a different number of display frames.

FIG. 9 is a flowchart illustrating a method 900 of controlling graphic displays within a multi-display HMI environment (e.g., the multi-display HMI environment 120) for industrial systems according to some configurations. The method 900 is described as being performed by the user device 125 and, in particular, the electronic processor 200. However, as noted herein, the functionality described with respect to the method 900 may be performed by other devices, such as the server 110, a component included in the industrial system 105, or a combination thereof, distributed among a plurality of devices, such as a plurality of servers included in a cloud service, or a combination thereof.

As illustrated in FIG. 9, the method 900 may include receiving operation data for the industrial system 105 (at block 905). Operation data of the industrial system 105 may include information or data related to operation of the industrial system 105 (or component(s) included therein). For instance, operation data may include, e.g., security and alarms related information, production related information, trend related information, efficiency related information, diagnostic related information, process related information, etc.

The electronic processor 200 may receive the operation data directly from the industrial system 105 (or component(s) included therein), such as, e.g., via the communication network(s) 135. Alternatively, or in addition, the electronic processor 200 may receive the operation data indirectly from the industrial system 105 (or component(s) included therein) via one or more intermediate devices through the communication network(s) 135. In some configurations, the electronic processor 200 may receive the operation data in real-time (or near real-time) (e.g., during operation of the industrial system 105). Alternatively, or in addition, the electronic processor 200 may receive the operation data periodically or intermittently, such as, e.g., according to a temporal metric (e.g., every five minutes, once a day, etc.), an operational metric (e.g., after producing a specific number of products, after each work cycle, etc.), etc. Alternatively, or in addition, the electronic processor 200 may access the operation data from a storage location. For example, the operation data may be stored in the server 110, in the memory 205 of the user device 125, etc. Accordingly, in some configurations, the operation data may be historic operation data for the industrial system 105 (or component(s) included therein).

The electronic processor 200 may execute the application 220 for the industrial system 105 (at block 910). In some configurations, the electronic processor 200 may execute the application 220 in response to receiving a request to launch (or execute) the application 220. For example, the electronic processor 200 may receive a request initiated by a user to launch (or execute) the application 220. In some configurations, the electronic processor 200 may interact with the server 110 as part of executing the application 220. For example, as noted herein, the server 110 may host or otherwise provide at least one industrial system service or platform (e.g., a process monitoring and supervisory control service). Accordingly, in some configurations, the server 110 may be associated with an industrial system service, such as, e.g., an industrial system service provided by the application 220. For example, in some configurations, the electronic processor 200 may interact with the server 110 to, e.g., access data associated with executing the application 220 (e.g., application specific data, operation data, etc.), access the application 220 (or functionality provided thereby), etc.

The electronic processor 200 may determine a set of display parameters for the application 220 (at block 915). In some configurations, the set of display parameters may be for a graphic display window or a display frame of the application 220. As noted herein, the application 220 may provide one or more graphic display windows that provide information (e.g., the operation data received at block 905) associated with the industrial system 105 (or component(s) included therein). As described in greater detail herein, a graphic display window may include a graphical representation or visualization of data (e.g., the operation data received at block 905) for the industrial system 105 (or component(s) included therein). For example, a graphic display window may provide a graphical representation of an overview of the industrial system 105 (e.g., as illustrated in FIG. 3), a process performed by the industrial system 105 (e.g., as illustrated in FIG. 4), a component status or other component specific information (e.g., as illustrated in FIG. 5), etc. As also noted herein, the graphic display window may include a set of components or portions. For example, a graphic display window may include a header portion and a content portion. As described in greater detail herein, the header portion may be a menu bar including a set of graphic control elements for controlling a corresponding graphic display (e.g., graphic display window). Alternatively, or in addition, the header portion may be a title bar including a title or other information for a corresponding graphic display (e.g., graphic display window). Accordingly, the header portion may be a control portion (e.g., a toolbar, a menu bar, a taskbar, a navigation bar, etc.).

In some configurations, the display parameter(s) may include resolution data for the plurality of display devices, a layout of the multi-display HMI environment 120 (e.g., the display devices 130 included therein), one or more associations between display devices 130 (or portions thereof) and corresponding graphic display, etc. Accordingly, in some configurations, the set of display parameters may include, for each display device 130 (or portion(s) thereof) a corresponding graphic display window, a resolution, and a position within the layout of the multi-display HMI environment 120, or a combination thereof.

The resolution data may include a resolution (e.g., a size of a display area) for one or more of the display devices 130 included in the multi-display HMI environment 120. For example, when each display device 130 of the multi-display HMI environment 120 is the same, the resolution data may include a single resolution (e.g., a size of a display area). However, in some instances, when the multi-display HMI environment 120 includes display devices 130 of varying resolutions, the resolution data may include two or more resolution.

The layout of the multi-display HMI environment 120 may include an arrangement of the display devices 130 (or portions thereof) included in the multi-display HMI environment 120. For instance, with reference to FIG. 6, the multi-display HMI environment 120 may have a two-by-two layout, where the first display device 130A is positioned above the third display device 130C and to the left of the second display device 130B, the second display device 130B is positioned above the fourth display device 130D and to the right of the first display device 130A, the third display device 130C is positioned below the first display device 130A and to the left of the fourth display device 130D, and the fourth display device 130D is positioned below the second display device 130B and to the right of the third display device 130C. are positioned directly above two additional display devices 130. Accordingly, the layout of the multi-display HMI environment 120 may specify a position or location of each display device 130 (or portion(s) thereof) within the multi-display HMI environment 120.

The display parameters may also include a set of associations between display devices 130 (or portion(s) thereof) and corresponding graphic display windows. For instance, each display device 130 (or portion(s) thereof) may be associated with (or otherwise linked to) a corresponding graphic display window. For example, the first display device 130A may be associated with a first graphic display window, the second display device 130B may be associated with a second graphic display window, etc. As another example, when the display device 130 is divided into multiple display frames, such as illustrated in FIG. 7, each portion of the display device 130 may be associated (or otherwise linked) to a corresponding graphic display window. For example, a first portion of the display device (e.g., associated with the first display frame 705A) may be associated with a first graphic display window, a second portion of the display device (e.g., associated with the second display frame 705B) may be associated with a second graphic display window, etc. Accordingly, the display parameters may include or otherwise specify the associations between display devices 130 (or portion(s) thereof) and corresponding graphic display windows.

In some configurations, the electronic processor 200 may determine the display parameter(s) based on a user profile. For instance, in some configurations, a user of the application 220 may be associated with a user profile. The user profile may include a set of preset or predefined user preferences or settings, including, e.g., the display parameter(s). Accordingly, in some configurations, the electronic processor 200 may determine (or otherwise identify) a user of the application 220 (e.g., based on an authentication or authorization process, biometric identification process, etc.). After determining the user of the application 220, the electronic processor 200 may access a user profile for that user and determine user preferences or settings for the application 220 (including, e.g., the display parameter(s)) such that, when the electronic processor 200 executes the application 220, the application 220 may be executed pursuant to those user preferences or settings. Although not illustrated, the user profile (or user preferences or settings, including the display parameter) may be stored locally in the memory 205 of the user device 110 or remotely, such as, e.g., at the server 110, such that the user profile (or user preferences or settings, including the display parameter) is accessible by the electronic processor 200. Accordingly, in some configurations, the set of display parameters may be included as a set of predefined display parameters, such as, e.g., part of a template for the multi-display HMI environment 120.

Figure 10:
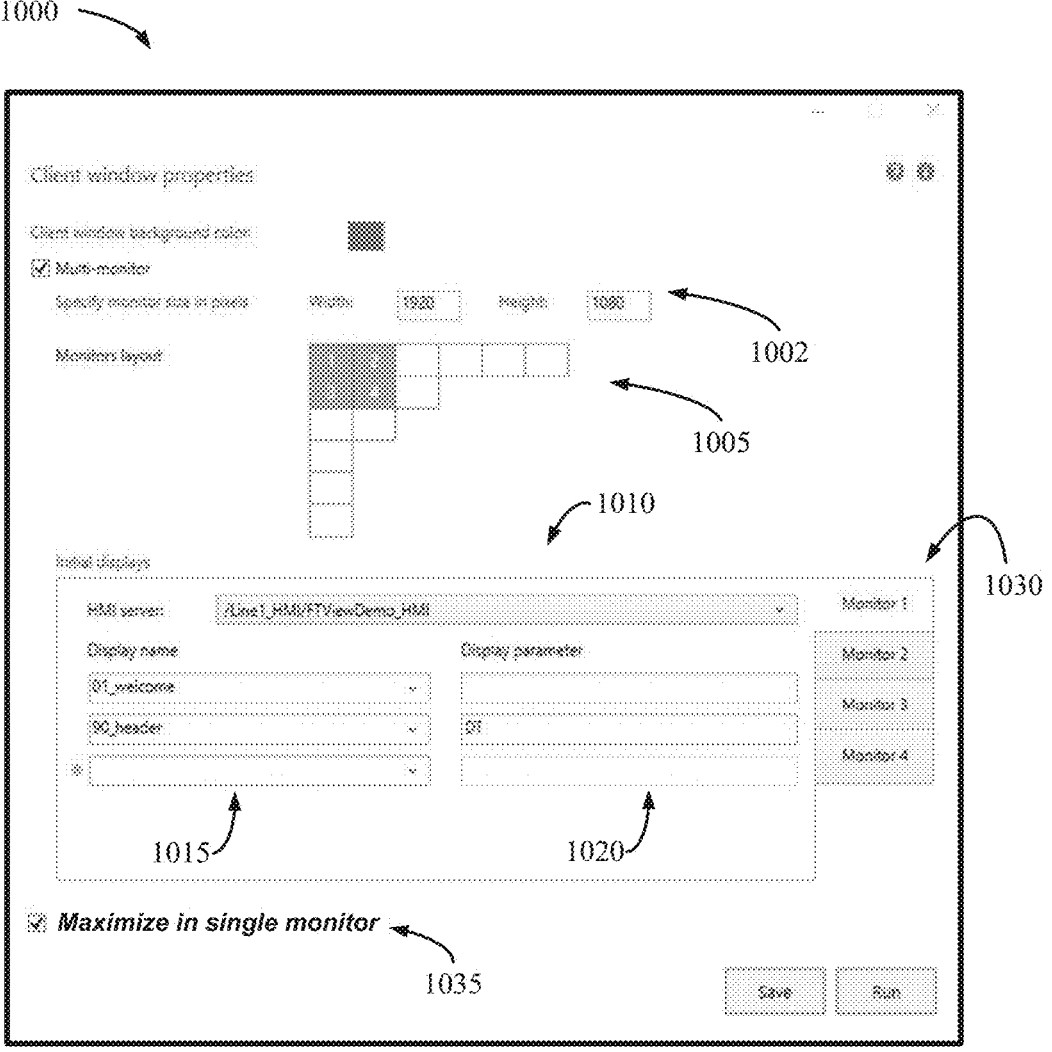
FIG. 10 illustrates an example user interface according to some configurations.

For example, FIG. 10 illustrates an example user interface (e.g., a GUI) 1000 according to some configurations. A user may interact with the user interface 1000 to set one or more display parameters or settings (e.g., as the set of display parameters) associated with the multi-display HMI environment (e.g., the multi-display HMI environment 120) via, e.g., the application 220. In some configurations, a user may interact with the user interface 1000 as part of setting up predefined display parameters (e.g., as part of a user profile for that user). Alternatively, or in addition, a user may interact with the user interface 1000 as part of adjusting or altering a display parameter (e.g., while the user is interacting with the multi-display HMI environment 120 to monitor processes and provide supervisory control for the industrial system 105).

As illustrated in FIG. 10, the user interface 1000 includes a layout portion 1005. A user may interact with a resolution portion 1002 of the user interface 1000 to provide resolution data associated with the multi-display HMI environment 120 (e.g., a resolution or size of one or more display devices 130 included within the multi-display HMI environment 120).

A user may interact with a layout portion 1005 to designate or define a number of display devices included in the multi-display HMI environment 120, a layout of the display devices included in the multi-display HMI environment 120, etc. The user interface 1000 may also include a displays portion 1010. The displays portion 1010 may include one or more GUI control elements, including, e.g., drop-down menus, text fields, radio buttons, check boxes, etc. As illustrated in the example of FIG. 10, the displays portion 1010 includes a series of input control elements 1015 that a user may interact with by selecting a graphic display window. The user may also select or provide a corresponding display parameter for a selected graphic display window using another series of input control elements 1020. For example, a user may interact with the series of input control elements 1020 in order to designate an alignment or position of a header portion for a corresponding graphic display window. The user interface 1000 may include a displays portion 1010 for each display device included in the multi-display HMI environment 120. For instance, a user may select a display device from a listing of display devices (e.g., represented in FIG. 10 as a set of tabs 1030, where each tab is associated with a display device of the multi-display HMI environment 120). Based on which display device is selected by the user, a corresponding displays portion 1010 may be provided via the user interface 1000 to the user, such that a user may select one or more graphic display windows (e.g., via interaction with the series of input control elements 1015), corresponding display parameters (e.g., via interaction with the series of input control elements 1020), etc. for the selected display device. The user interface 1000 may also include a GUI control element 1035 for enabling a maximization function that facilitates maximization of graphic display windows to corresponding display frames such that each graphic display window, when maximized, is maintained (or maximized) within the corresponding graphic display frame.

In some configurations, the information provided via the user interface 1000 may be used to generate or otherwise provide the graphic display mapping 225. For instance, in some configurations, the electronic processor 200 may receive information via the user interface 1000 and generate (or update) the graphic display mapping 225 using the information received via the user interface 1000.

In some configurations, the electronic processor 200 may determine a configuration for one or more display frames for the application 220 (at block 920). A configuration of a display frame may include one or more properties of the display frame. For instance, the configuration of a display frame may specify a resolution or size of the display frame, and, ultimately, a resolution or size of a display area or region included within the display frame. Accordingly, in some configurations, the configuration may include a display size for the display frame. A display size may refer to a displayable area or region included within the display frame, as provided via the display device 130 (or portion(s) thereof). In some configurations, the display size may be a maximum display size for the first display frame. In some configurations, the configuration of a display frame may identify a corresponding graphic display window associated with the display frame. In some configurations, the configuration of a display frame may also include a location or placement of the display frame within the multi-display HMI environment 120. For example, the configuration may specify a particular display device 130. Following this example, the display frame may be substantially the same size or resolution as the display area provided by the display device 130, such that the display frame includes the display area provided by the display device 130. Alternatively, or in addition, in some configurations, the configuration may specify a portion of a display device 130. Following this example, the configuration of the display frame may include a location of the portion of the display device 130, a resolution or size of the portion (as a resolution or size of the display frame), etc.

In some configurations, the electronic processor 200 may determine the configuration based on one or more display parameters (e.g., as determined at block 915). For example, in some configurations, the electronic processor 200 may determine a configuration for a first display frame based on the resolution data, the association(s), and the layout included in the display parameters.

In some configurations, the electronic processor 200 may access or otherwise utilize the graphic display mapping 225 to determine the arrangement. For instance, in some configurations, the electronic processor 200 may identify a relevant display frame within the graphic display mapping 225. The electronic processor 200 may then determine whether the display frame is configured (e.g., whether the associated graphic display window is associated with a set of display parameters). When the display frame is configured, the electronic processor 200 may then retrieve the associated display parameters and determine the arrangement for the graphic display window based on those display parameters.

As one example, the electronic processor 200 may determine (or otherwise identify) a display device 130 (or a portion of a display device 130) associated with the corresponding graphic display window for the display frame. The electronic processor 200 may identify the display device 130 (or portion thereof) based on, e.g., the association(s) included in the display parameters. Once the electronic processor 200 identifies the display device 130 (or portion thereof), the electronic processor 200 may determine a resolution of the display device 130 (or portion thereof) based on the resolution data of the display parameters. The electronic processor 200 may then determine a position of the display device 130 (or portion thereof) within the HMI-client frame 620 based on the layout of the multi-display HMI environment 120. The electronic processor 200 may then determine the configuration for the display frame based on the resolution and the position of the display device 130. For instance, the electronic processor 200 may determine a maximum display size for the display frame, a position of the display frame within the multi-display HMI environment 120, a graphic display window associated with the display frame, etc.

Accordingly, in some configurations, the electronic processor 200 may determine a resolution of the display device 130 (or a portion thereof) based on the resolution data. The electronic processor may also determine a position of the display device 130 within the HMI-client frame based on the layout of the multi-display HMI environment 120. Based on the resolution and the position, the electronic processor 200 may determine the configuration for the display frame.

Continuing with the method 900, the electronic processor 200 may then generate, based on the configuration, the graphic display window within the first display frame (at block 925). The electronic processor 200 may generate the graphic display window such that the graphic display window includes at least a portion of the operation data (e.g., as received at block 905), where that portion of the operation data may be relevant to or associated with a feature or attribute of the industrial system 105 that is being provided by the graphic display window. For example, when the graphic display window is for a process of the industrial system 105, the operation data included in the graphic display window may include operation data associated with that process of the industrial system 105. In some configurations, the graphic display window includes an interactive representation of data for the industrial system.

The electronic processor 200 may generate the graphic display window such that, when the graphic display window is maximized, the graphic display window is maintained within the corresponding display frame. For instance, the electronic processor 200 may generate the graphic display window such that the graphic display window is maximized within the corresponding display frame (e.g., the graphic display is maximized pursuant to the maximized display area of the corresponding display frame).

The electronic processor 200 may display the graphic display window (at block 930). In some configurations, the electronic processor 200 may transmit the graphic display window to a display device 130 for display to a user. In response to receiving the display device 130, the display device 130 may display the graphic display window to the user. In some configurations, the graphic display window is displayed within a display area (or a portion thereof) of the display device 130.

In some configurations, the electronic processor 200 may also display the application 220 (e.g., as a GUI or interface of the application 220) using the multi-display HMI environment 120. For instance, the electronic processor 200 may display the application 220 across multiple display devices 130 (e.g., within the HMI-client frame 620 of the application

220) while the graphic display window, when maximized, is maintained, or restricted, to the corresponding display frame for the graphic display.

In some configurations, the electronic processor 200 generates and displays the graphic display window such that the graphic display window is maximized within the first display frame when the graphic display window is initially displayed to a user via the display device 130. Alternatively, or in addition to, the electronic processor 200 may generate and display the graphic display window such that the graphic display window is not maximized within the first display frame when the graphic display window is initially displayed to a user via the display device 130.

In some configurations, the electronic processor 200 may receive a maximization command (as a user interaction or input) for the graphic display window. The maximization command may be initiated by user interacting with a maximize button or GUI control element of the graphic display window. Responsive to receipt of the maximization command, the electronic processor 200 may maximize the graphic display window within the display frame (e.g., such that the maximized graphic display window is maintained within the display frame). In some configurations, the electronic processor 200 may maximize the graphic display window by re-sizing or otherwise adjusting the size of the graphic display window such that the graphic display window aligns with the maximized display area of the corresponding display frame.

Figure 11:
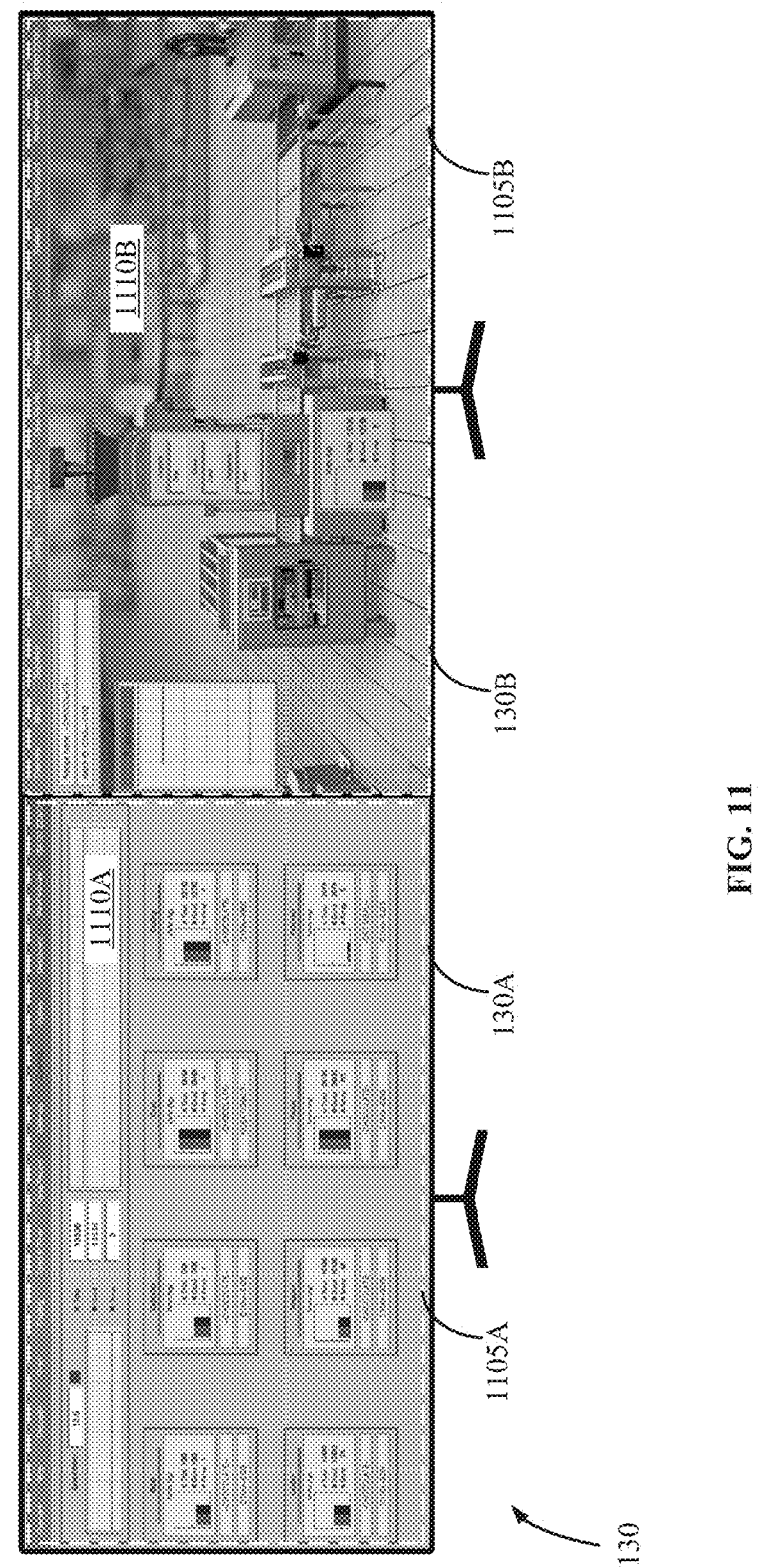
FIG. 11 illustrates an example multi-display HMI environment with graphic display windows maximized within corresponding display frames according to some configurations.

For example, FIG. 11 illustrates an example multi-display HMI environment 1100 (e.g., the multi-display HMI environment 120) with graphic display windows maximized within corresponding display frames according to some configurations. As illustrated in FIG. 11, the multi-display HMI environment 1100 includes two display devices 130 (e.g., a first display device 130A and a second display device 130B). In the example illustrated in FIG. 11, each display device 130 is associated with a display frame. For example, the first display device 130A is associated with a first display frame 1105A and the second display device 130B is associated with a second display frame 1105B. However, in some configurations, the display frame(s) may be a portion of a display device 130 such that a single display device 130 may include multiple display frame(s). As illustrated in FIG. 11, a first graphic display window 1110A is maximized within the first display frame 1105A via the first display device 130A and a second graphic display 1110B window is maximized within the second display frame 1105B via the second display device 130B. Accordingly, in the example illustrated in FIG. 11, each graphic display window 1110A-1110B is maximized within a corresponding display frame 1105A-1105B.

In some configurations the electronic processor 200 may repeat one or more operations of the method 900 (e.g., blocks 920-930). For instance, in some configurations, the electronic processor 200 may repeat one or more operations of the method 900 for one or more additional graphic display windows provided by the application 220 (e.g., a second graphic display window, a third graphic display window, etc.). For instance, the electronic processor 200 may determine a configuration for a second display frame (e.g., for a second graphic display window) (e.g., as similarly described above with respect to block 920). In some configurations, the electronic processor 200 may determine the configuration for the second display frame by determining a resolution of a display device 130 (or portion thereof) associated with the second display frame based on the resolution data (e.g., the set of display parameters determined at block 915)

and determining a position of the display device 130 (or portion thereof) within the HMI-client frame based on the layout of the multi-display HMI environment 120, where the configuration for the second display frame is based on the resolution and the position of the display device 130 (or portion thereof). The electronic processor 200 may generate, based on the configuration, the second graphic display window within the second display frame and transmit, to the display device 130, the second graphic display window for display via the display device 130. The electronic processor 200 may also display (or cause to be displayed) the second graphic display window such that the second graphic display window is maintained within the second display frame when the second graphic display window is maximized, and the first graphic display is maintained within the first graphic display window when the first graphic display window is maximized.

In some configurations, a graphic display window may include a set of components or portions. For example, a graphic display window may include a header portion, a content portion, etc. A header portion may include a menu bar including a set of graphic control elements for controlling a corresponding graphic display window, a title bar including a title or other information for a corresponding graphic display window, etc. Accordingly, the header portion may be a control portion (e.g., a toolbar, a menu bar, a taskbar, a navigation bar, etc.). A content portion may provide data or information (e.g., the operation data received at block 905) for the industrial system 105 (or component(s) thereof). For example, the content portion may provide graphic objects or textual elements related to operation of the industrial system 105.

For instance, in some examples, a user may set a docking alignment or position for a component of a graphic display window (e.g., a header portion, a content portion, etc.). The alignment or docking parameter may be included in the set of display parameters. Accordingly, in some configurations, the electronic processor 200 may determine a configuration for a display frame (e.g., as similarly described above with respect to block 920), generate a graphic display window (e.g., as similarly described above with respect to block 925), etc. based on an alignment or docking parameter for a component of a graphic display window such that, when the graphic display window is maximized, the component associated with the docking parameter and the remaining components of the graphic display window (e.g., components not associated with a docking parameter) do not overlap.

For instance, in some configurations, when maximizing a graphic display, the docked component position, size, z-order, etc. may not change. The display area for maximizing a graphic display or for displaying graphic display windows may be the area that is not occupied by the docked component within the display frame. Accordingly, in some configurations, the maximized area may be the difference between the display frame area and an area of the docked component. In some configurations, the display frame may maintain a list of docked component(s) and maximized display within it. When maximizing the display, the electronic processor 200 may calculate the size and position of the display frame and exclude the docked components. In some configurations, when the display frame has a maximized graphic display window and a docked component is opened/closed, the electronic processor 200 may recalculate or re-scale the maximized graphic display window to fit the display area inside the display frame.

Figure 12:
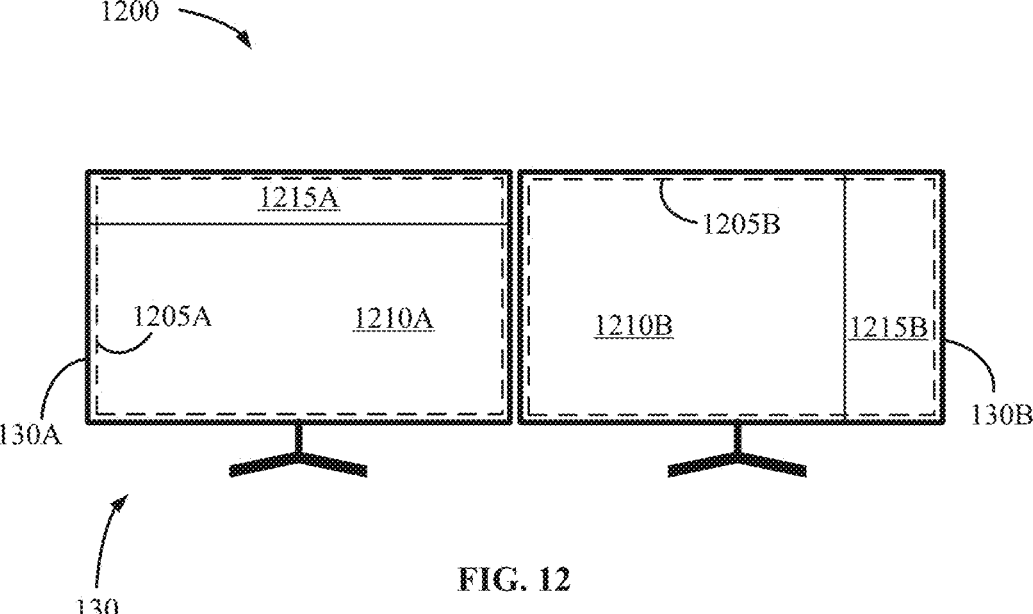
FIG. 12 illustrates an example multi-display HMI environment with graphic display windows maximized within corresponding display frames, where the graphic display windows have docketed components, according to some configurations.

For example, FIG. 12 illustrates an example multi-display HMI environment 1200 (e.g., the multi-display HMI environment 120) with graphic display windows maximized within corresponding display frames, where the graphic display windows have docket components, according to some configurations. As illustrated in FIG. 12, the multi-display HMI environment 1200 includes two display devices 130 (e.g., a first display device 130A and a second display device 130B). In the example illustrated in FIG. 12, each display device 130 is associated with a display frame. For example, the first display device 130A is associated with a first display frame 1205A and the second display device 130B is associated with a second display frame 1205B. However, in some configurations, the display frame(s) may be a portion of a display device 130 such that a single display device 130 may include multiple display frame(s). As illustrated in FIG. 12, the first display frame 1205A includes a first graphic display window 1210A and a first docked component 1215A and the second display frame 1205B includes a second graphic display window 1210B and a second docked component 1215B. As illustrated in FIG. 12, the first graphic display window 1210A is maximized within the first display frame 1205A via the first display device 130A such that the first docked component 1215A and the remaining components of the first graphic display window 1210A do not overlap (e.g., a content portion of the first graphic display window 1210A). For instance, when the first docked component 1215A is docked to a top portion, the remaining components of the first graphic display window 1210A (e.g., a content portion) may be maximized to an area of the first display frame 1205A that is not occupied by the first docked component 1215A. Similarly, as illustrated in FIG. 12, the second graphic display window 1210B is maximized within the second display frame 1205B via the second display device 130B such that the second docked component 1215B and the remaining components of the second graphic display window 1210B do not overlap (e.g., a content portion of the second graphic display window 1210B). For instance, when the second docked component 1215B is docked to a right-side position, the remaining components of the second graphic display window 1210B (e.g., a content portion) may be maximized to an area of the second display frame 1205B that is not occupied by the second docked component 1215B.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A non-transitory, computer-readable medium storing instructions that, when executed by one or more electronic processors, perform a set of functions, the set of functions comprising:

executing, within a multi-display HMI environment including a plurality of display devices, an HMI-client application for an industrial system, the HMI-client application including a plurality of graphic display user interfaces, wherein an HMI-client frame for displaying the HMI-client application includes a display area of the plurality of display devices and wherein the HMI-client frame includes at least one corresponding display frame for each graphic display user interface of the plurality of graphic display user interfaces;

determining a set of display parameters for the HMI-client application, the set of display parameters including resolution data for the plurality of display devices and a layout of the plurality of display devices;

determining a resolution of a first display device of the plurality of display devices based on the resolution data;

determining a position of the first display device within an HMI-client frame of the HMI-client application based on the layout of the plurality of display devices;

determining, based on the resolution and the position of the first display device, a configuration for the first display frame included in a plurality of display frames for the HMI-client application;

generating, based on the configuration, a first graphic display user interface within the first display frame;

displaying, via a first display device of the plurality of display devices, the first graphic display user interface within the first display frame;

receiving a maximization command for the first graphic display user interface; and responsive to receipt of the maximization command, maximizing the first graphic display user interface such that the first graphic display user interface is maintained within the first display frame when maximized.

2. The non-transitory, computer-readable medium of claim 1, wherein the set of functions further comprises:

determining a second resolution of a second display device of the plurality of display devices based on the resolution data;

determining a second position of the second display device within the HMI-client frame based on the layout of the plurality of display devices;

determining a second configuration for a second display frame included in the plurality of display frames for the HMI-client application, wherein the second configuration for the second display frame is based on the second resolution and the second position of the second display device;

generating, based on the second configuration, a second graphic display user interface within the second display frame; and transmitting, to the second display device, the second graphic display user interface for display via the second display device, wherein the second graphic display user interface is maintained within the second display frame when the second graphic display user interface is maximized and the first graphic display user interface is maintained within the first display frame when the first graphic display user interface is maximized.

3. The non-transitory, computer-readable medium of claim 2, wherein the set of functions further comprises:

displaying the HMI-client application across the plurality of display devices within the HMI-client frame;

displaying and maximizing the first graphic display user interface of the HMI-client application within the first display frame for the first graphic display user interface on the first display device of the plurality of display devices; and displaying and maximizing the second graphic display user interface of the HMI-client application within the second display frame for the second graphic display user interface on the second display device of the plurality of display devices.

4. A system of controlling graphic displays within a multi-display human machine interface ("HMI") environment for industrial systems, the system comprising:

a plurality of display devices configured to provide, within the multi-display HMI environment, an HMI-client application configured to provide a plurality of graphic display user interfaces for an industrial system; and one or more electronic processors communicatively coupled to the plurality of display devices and configured to:

execute, within the multi-display HMI environment, the HMI-client application for the industrial system;

determine a set of display parameters for the HMI-client application, the set of display parameters including resolution data for the plurality of display devices and a layout of the plurality of display devices;

determine a resolution of a first display device of the plurality of display devices based on the resolution data;

determine a position of the first display device within an HMI-client frame of the HMI-client application based on the layout of the plurality of display devices;

determine, based on the set of display parameters, a configuration for the first display frame included in a plurality of display frames for the HMI-client application based on the resolution and the position of the first display device;

generate, based on the configuration, a first graphic display user interface within the first display frame; and display, via a first display device of the plurality of display devices, the first graphic display user interface within the first display frame such that the first graphic display user interface is maintained within the first graphic display.

5. The system of claim 4, wherein, when displayed, the first graphic display user interface is maximized within the first display frame.

6. The system of claim 4, wherein the one or more electronic processors are configured to:

receive a maximization command for the first graphic display user interface; and responsive to receipt of the maximization command, maximize the first graphic display user interface within the first display frame.

7. The system of claim 4, wherein the set of display parameters identifies an association between the first display device of the plurality of display devices and the first graphic display user interface.

8. The system of claim 4, wherein the set of display parameters includes, for each display device of the plurality of display devices, a corresponding graphic display user interface and a resolution.

9. The system of claim 4, wherein the set of display parameters includes a set of predefined display parameters as a template for the multi-display HMI environment.

10. The system of claim 4, wherein the configuration for the first display frame identifies, from a plurality of display frames, the first graphic display user interface as being associated with the first display frame.

11. The system of claim 4, wherein the configuration for the first display frame includes a display size for the first display frame.

12. The system of claim 11, wherein the display size is a maximum display size for the first display frame.

13. A method of controlling graphic displays within a multi-display human machine interface ("HMI") environment for industrial systems, the method comprising:

executing, with one or more electronic processors, an HMI-client application for an industrial system within the multi-display HMI environment including a plurality of display devices;

determining, with the one or more electronic processors, a set of display parameters for the HMI-client application, the set of display parameters including resolution data for the plurality of display devices and a layout of the plurality of display devices;

determining, with the one or more electronic processors, a resolution of a first display device of the plurality of display devices based on the resolution data;

determining, with the one or more electronic processors, a position of the first display device within the HMI-client frame based on the layout of the plurality of display devices; and determining, with the one or more electronic processors, a configuration for the first display frame included in the plurality of display frames for the HMI-client application, wherein the configuration for the first display frame is based on the resolution and the position of the first display device;

generating, based on the configuration, a first graphic display user interface within the first display frame; and transmitting, with the one or more electronic processors, to the first display device, the first graphic display user interface for display via the first display device such that, when maximized, the first graphic display user interface is maintained within the first graphic display.

14. The method of claim 13, wherein, when displayed, the first graphic display user interface is maximized within the first display frame.

15. The method of claim 13, further comprising:

receiving a maximization command for the first graphic display user interface; and responsive to receipt of the maximization command, maximizing the first graphic display user interface within the first display frame.

16. The method of claim 13, wherein determining the set of display parameters includes identifying an association between the first display device of the plurality of display devices and the first graphic display user interface.

17. The method of claim 13, wherein determining the configuration for the first display frame includes determining a maximum display size for the first display frame, wherein the maximum display size is a display area of the first display frame.

* * * * *